United States Patent [19]
Law

[11] Patent Number: 5,243,139
[45] Date of Patent: Sep. 7, 1993

[54] LAY IN STRAIN RELIEF BUSHING FOR VARIABLE WIRE SIZES

[75] Inventor: Joseph P. Law, Scotch Plains, N.J.

[73] Assignee: Heyco Molded Products, Inc., N.J.

[21] Appl. No.: 889,080

[22] Filed: May 26, 1992

[51] Int. Cl.⁵ .......................................... H01B 17/26
[52] U.S. Cl. ............................ 174/153 G; 174/152 G; 174/135; 248/56
[58] Field of Search .......... 174/153 G, 153 R, 152 G, 174/135, 155, 156, 65 G; 248/56, 74.3; 439/464, 467, 471

[56] References Cited

U.S. PATENT DOCUMENTS

| | | | |
|---|---|---|---|
| 2,424,758 | 7/1947 | Klumpp, Jr. | 174/153 G |
| 2,563,604 | 8/1951 | Hultgren | 174/153 G |
| 2,895,003 | 7/1959 | Rapata | 174/153 G |
| 2,974,186 | 3/1961 | Klumpp, Jr. | 174/153 G |
| 3,056,852 | 10/1962 | Sachs | 174/153 G |
| 3,290,430 | 12/1966 | Klumpp, Jr. et al. | 174/153 G |
| 3,464,659 | 9/1969 | Klumpp, Jr. et al. | 248/56 |
| 3,493,205 | 2/1970 | Bromberg | 248/56 |
| 3,751,579 | 8/1973 | Nojiri | 174/153 G |
| 3,953,665 | 4/1976 | Nicholson | 174/153 G |
| 4,117,998 | 10/1978 | Notoya | 248/56 |
| 4,493,467 | 1/1985 | Borja | 248/56 |
| 4,568,047 | 2/1986 | Matsui | 248/56 |
| 4,892,979 | 1/1990 | Rossow | 174/153 G |
| 4,913,385 | 4/1990 | Law et al. | 248/56 |

FOREIGN PATENT DOCUMENTS 1333669 8/1972 United Kingdom .
1418634 1/1975 United Kingdom .

Primary Examiner—Leo P. Picard
Assistant Examiner—Hyung S. Sough
Attorney, Agent, or Firm—Auslander & Thomas

[57] ABSTRACT

A molded plastic strain relief bushing and method includes a body with a channel. A hinged head on the body has one portion contiguous with the channel. There is a well and key receiver at the well. Wire or cable is laid in the channel, locked into the channel in strain relief engagement. The head is then folded over the wire or cable and the strain relief bushing engaged in an aperture. The function of holding the wire or cable is separate from the function of engaging the strain relief bushing. The split head enables the functions to be separate and yet permit the laying in of the wire or cable without the awkward need to thread the wire or cable through a fixed opening in the strain relief bushing.

12 Claims, 4 Drawing Sheets

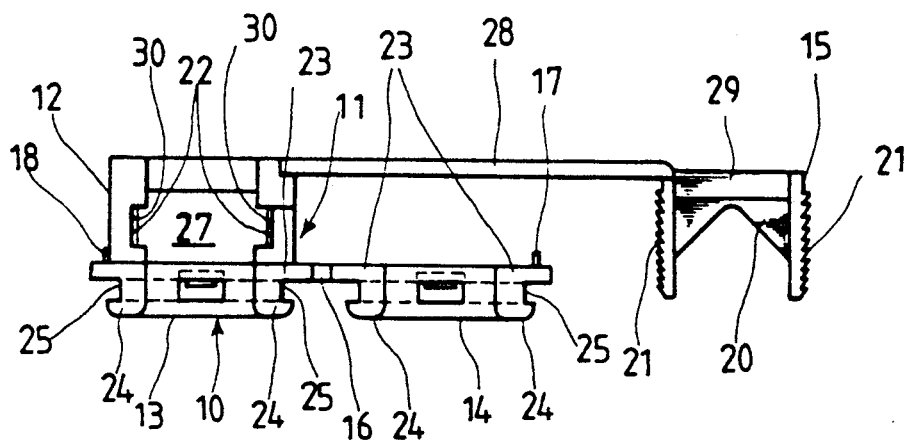
Fig. 1
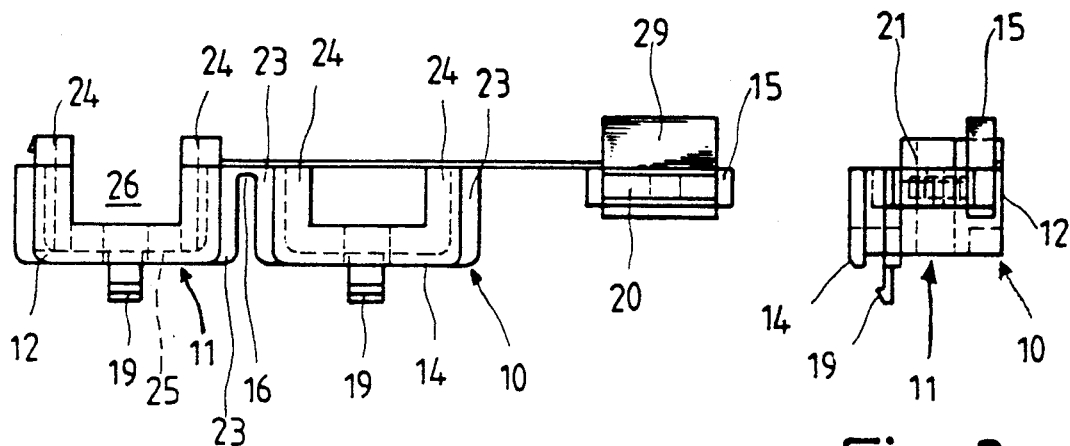
Fig. 2
Fig. 3
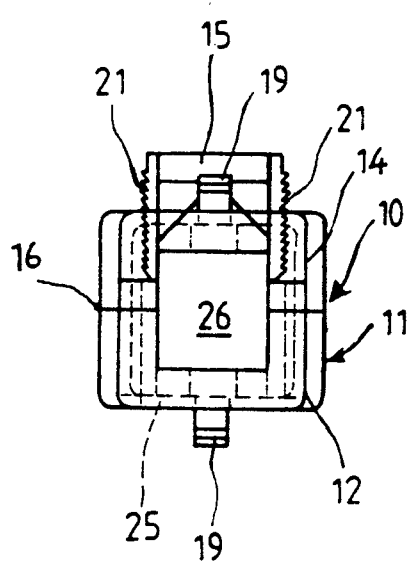
Fig. 4

LAY IN STRAIN RELIEF BUSHING FOR VARIABLE WIRE SIZES

BACKGROUND OF THE INVENTION

The present invention is a one piece molded plastic strain relief lay in bushing, which is engagable substantially without protrusion from an aperture or chassis, where no ninety degree bends are provided for. The one piece molded strain relief bushing is retrofitable in existing installations and provides effective strain relief from within the normal inside portion of a chassis or mounting wall.

A single molded strain relief bushing is adapted to receive a wide range of wire, cable or bundles of wire or cable, of different diameters which may be laid into the open bushing configuration, either manually or by machine automation. The wire, cable or bundles of wire or cable, of different diameter are secured in the bushing in lazy bend strain relief engagement. The head of the molded strain relief bushing is split and flanged. The head may be optionally closed and/or locked and the bushing engaged in an aperture.

The hinged head on the body has one portion contiguous with the channel. The well and key receiving means at the well enable wire or cable to be laid in the channel, locked into the channel in strain relief engagement and the head folded over the wire or cable and then have the strain relief bushing engaged in an aperture. The function of holding the wire or cable is separate from the function of engaging the strain relief bushing.

A single sized bushing may accept a wide variety of laid in wire, cable or bundles of wire or cable, of different diameter, to accommodate the varying needs of the electrical and electronic component industry. The assembly is automatable and labor saving and the molded strain relief bushing of the present invention is inexpensive to produce.

Assembly of electrical or electronic components has oftentimes required manual assembly with special tools for cable held in a bushing being snapped into an aperture. The bushing with cable engaged usually locked itself in strain relief engagement once in an aperture. The bushings of the past themselves generally comprised two portions joined by some form of webbing. The webbing oftentimes complicated the engagement of the cable in the bushing. Such bushings of the past were usually mounted with small flanges extending outside the chassis or wall unless there was special provision for a ninety degree bend in the wire or cable.

There were usually different bushings for different cable or wire sizes and different aperture sizes. The bushings of the past themselves generally comprised two portions joined by some form of webbing. Such bushings of the past generally depended upon the engagement in the aperture to provide strain relief.

The present invention is a structurally simple strain relief bushing with a lock for wire, cable or bundles of wire or cable, of different diameter in a well and a separate foldable head portion, which is engagable in an aperture and optionally lockable to itself. The structure of the bushing enables effective automated assembly of cable and bushing, effective locking of the bushing and cable, economy of size, maximum strength, ease of insertion of the assembled bushing and cable into a aperture. The molded strain relief bushing of the present invention reduces the number of different bushing constructions necessary to meet the needs of different panel thicknesses and the need for many different apertures of different sizes for different wire, cable or bundles of wire or cable, of different diameter and the need for many different strain relief bushings for different apertures and wire, cable or bundles of wire or cable, of different diameter.

DESCRIPTION OF THE RELATED ART

In U.S. Pat. No. 4,913,385 the present inventor provided a strain relief bushing with a fixed lazy bend strain relief and a separate aperture locking means allowing a wire or cable to be locked in strain relief engagement before insertion into and aperture. This effective strain relief did not readily adapt to adequate strain relief for wire, cable or bundles of wire or cable, of different diameter, U.S. Pat. No. 4,913,385 shows a hinged strain bushing for a substantially limited selection of wire or cable thicknesses or diameters and limited different apertures and wall thicknesses.

U.S. Pat. No. 3,493,205 separated the strain relief function from the aperture engagement by providing a lazy bend strain relief, non split bushing with a separate plug that enabled preassembly of the wire or cable. Although the inventor contemplated a wide range of sizes threading of the wire or cable necessarily had to be through the bushing.

U.S. Pat. No. 3,751,579 advanced the art and is strain relief bushing, an improvement of U.S. Pat. No. 3,493,205 with a open body and a plug only covering the body of the strain relief bushing. U.S. Pat. No. 3,751,579 discloses an aperture engaged lazy bend strain relief adaptable for a variety of different diameter wire or cable or bundles thereof, which includes a ratcheted latch in a lazy bend configuration engagable in an aperture. The key acts as a closure for the strain relief and cover and also forms a closure in the panel in which the aperture is. The bushing does not have the optional separate latch enclosure, nor the flexible latching adapting to the diameter of the wire or cable or bundles thereof.

U.S. Pat. No. 4,493,467 shows a complex prior art strain relief structure with a hinged portion adapted to lock a cable in strain relief engagement in a bushing. The bushing also includes fingers engagable with the wall of an aperture in a panel.

U.S. Pat. No. 4,117,998 is another prior art rectangular type bushing having a juxtaposed two part hinged construction and a hook engagement adapted to close the bushing portions over a cable.

There are of course bulky, without lazy bend, strain relief capabilities.

Bushings such as disclosed in British patents Nos. 1,333669 and 1,418,634 have no key and depend on a separate hook and latch to lock the bushing for strain relief.

In U.S. Pat. Nos. 3,290,430 and 3,464,659 among others are strain relief bushings, where the bushing portions are held away from each other by straps. The straps are exemplary of strain relief bushings having joined parts.

U.S. Pat. No. 3,056,852 is exemplary of another type of hinged aperture engagable strain relief with a hinged infoldable conical type strain relief.

U.S. Pat. Nos. 2,563,604 and 2,974,186 among others are strain relief bushings are held by hinges or hinge like straps.

U.S. Pat. Nos. 2,895,003, 3,953,665 and 4,568,047 among others are strain relief bushings where the bushing portions are held by end or head straps or even include latch fitting of the parts. All of these bushings have limited range for different diameter wire or cable or bundles thereof.

U.S. Pat. No. 2,424,758 is an exemplary lazy bend aperture engagable strain relief.

SUMMARY OF THE INVENTION

The present invention is a molded plastic strain relief bushing adapted for holding a wide range of wire or cable or bundles thereof. The bushing is preferably square, but may be round and comprises a body with a strap hinged head, which may or may not be latchable in closed position and a ratchet key on a strap. The key may have an inner centrally angulated flange to adapt to wire or cable or bundles thereof, so that as the ratchets on the key engage with the pawls in the body, the wire or cable or bundles thereof are drawn together and pushed into a well in the body in lazy bend strain relief engagement.

In a preferred embodiment, a rectangular hinged bushing is provided with a slotted head which, may lock closed to surround the wire, cable or bundles of wire or cable, of different diameter, once the wire, cable or bundles of wire or cable, of different diameter are laid into the body of the bushing. In a preferred embodiment, the body is provided with flexible fingers biased inward towards the slot, so that the bushing, when engaged in an aperture, can compensate for any conventional variations between the slot and the aperture thickness.

The bushing easily fits into a U shaped slot and can also be stacked.

Preferably in use, the wire or cable or bundles thereof are laid into the body of the bushing, the key is depressed, locking the wire or cable or bundles thereof into the well and then the wire or cable or bundles thereof held in the bushing, are engaged in the slot for use.

In another embodiment a hinged head, which may be round, is provided with gripping fingers, including shoulders, which may be engaged in a round aperture, the fingers adapting to the thickness of the aperture walls. In this configuration, it may be necessary to thread the key on the strap into the aperture before engaging the head, since the key, when engaged, may extend beyond the periphery of the aperture and may not be push insertable thereby.

The aperture engaging fingers then hold the bushing together without need for a formal latching mechanism.

According to the present invention a molded plastic strain relief bushing includes a body through which a cable may be engaged. The molded strain relief bushing has a body with a first head portion and second head portion. The head portions are joined by a hinge. The head portions have face portions with openings and a flange portion. The head portions are engagable with the face openings apposed. there is a longitudinal channel in the body, integral and contiguous with one of the head portions. The longitudinal channel has a well. The body has means to receive a key which is substantially perpendicular to and straddling the longitudinal channel, adjacent the well. Key means are engagable in the key receiving means to straddle the well. The key means are unidirectionally movable in locking engagement in the key receiving means so that selected wire or cable engaged in the longitudinal channel is held in strain relief engagemnt in the well by depressing the key.

The strain relief bushing may be in one piece and the key may be attached to the body by a webbing. The head portions may include peripheral channels and interlocking means such as a latch and detent or a pin and an engaging opening. The head portions may also include radially outward biased fingers.

The head portions may have axial engaging fingers which may include engaging shoulders. The key receiving means may include a pair of channels at least one of which has a pawl.

The key may have ratchets, a head and a V shaped inner panel.

A method of engaging wire or cable in an aperture with a bushing of the present invention includes the steps of providing the wire or cable and laying it in the longitudinal channel of the strain relief bushing. The key is then depressed in the key receiving means engaging the cable or wire. The head portions are then closed the strain relief bushing is placed in the aperture.

Although such novel feature or features believed to be characteristic of the invention are pointed out in the claims, the invention and the manner in which it may be carried out, may be further understood by reference to the description following and the accompanying drawings.

BRIEF DESCRIPTION OF THE DRAWING

FIG. 1 is a top plan view of the molded plastic strain relief bushing of the present invention.

FIG. 2 is a front elevation of FIG. 1.

FIG. 3 is a side elevation of FIG. 1.

FIG. 4 is a rear elevation of the bushing of FIG. 2 in closed position with the key engaged.

Referring now to the figures in greater detail, where like reference numbers denote like parts in the various figures.

DESCRIPTION OF THE PREFERRED EMBODIMENTS

Figure 5:
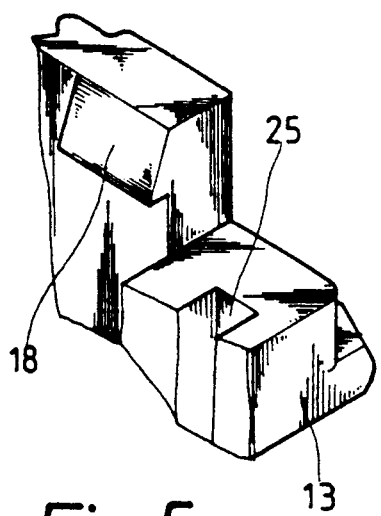
FIG. 5 is a blown up front elevation isometric detail of the circled portion of the body, as shown in FIG. 1, showing the head latch ratchet.

The molded very large wire range strain relief bushing 10 includes a body 11 having a rear portion 12 and a first head portion 13 and a second head portion 14. There is a key 15 and a hinge 16. The second head portion 14 includes a detent 17 engagable with a latch 18, which can be best seen in the detail FIGS. 5 and 6.

As can best be seen in FIGS. 2, 3 and 4, spring biased fingers 19 extend from the first head portion 13 and second head portion 14 to hold the strain relief bushing 10 biased firmly against the panel walls when the bushing 10 is engaged in an aperture (not shown). The key 15 has a V shaped inner panel 20 and side ratchets 21 engagable with pawls 22 in the body 11. The first and second head portions, 13, 14 each have back panels 23 and front panels 24, which form channels 25 in the head portions 13, 14.

The body 11 has an opening 26 therethrough, which is defined as shown in FIG. 4 by the joined first and second head portions 13, 14. There is also a well 27 in the body 11 and a strap 28 joining the key 15 to the body 11. The key 15 includes a head 29. The pawls 22 are preferably in channels 30 in the body 11.

Figure 6:
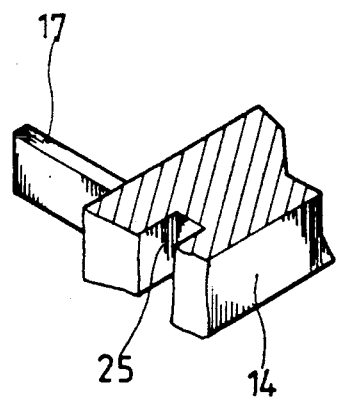
FIG. 6 is a blown up cutaway isometric detail of the circle portion of the head, as shown in FIG. 1, showing the head latch detent in position to be engaged.

As can be seen in FIGS. 5 and 6, when there is an interlockability between first and second head portions 13, 14. The detent 17 slides over the latch 18 engaging itself and locking the first and second head portions 13, 14 together.

Figure 8:
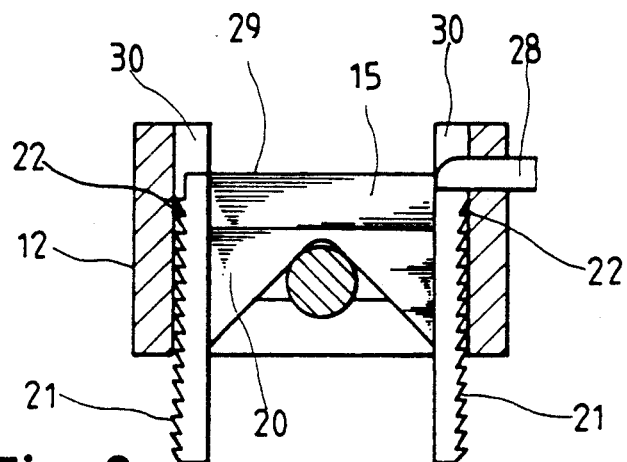
FIG. 8 is a front elevation section detail of FIG. 1 showing the key engaged with a small diameter cable or bundle.
Figure 7:
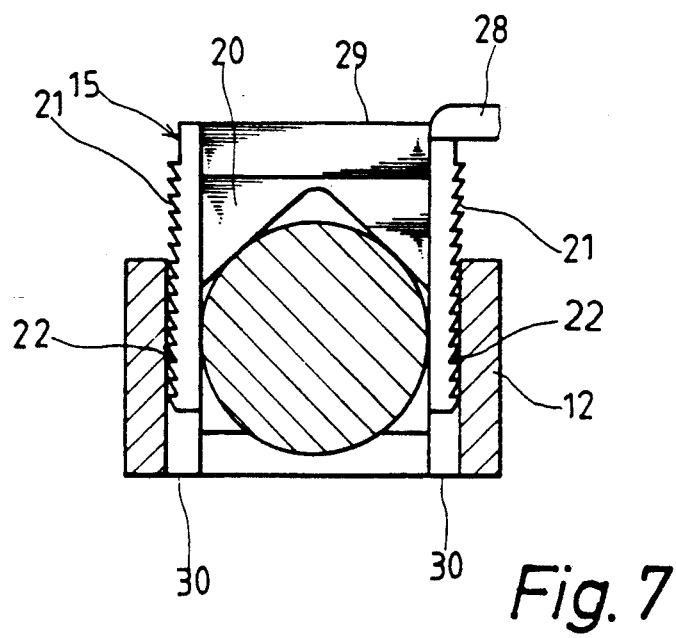
FIG. 7 is a front elevation section detail of FIG. 1 showing the key engaged with a wide diameter cable or bundle.

As shown in FIGS. 7 and 8, the key 15 is engaged in the channels 30 of the body 11. The side ratchets 21 engage with the pawls 22 locking the key 15 in position engaging a wire, cable or bundles of wire or cable, of different diameter in well 27.

Figure 9:
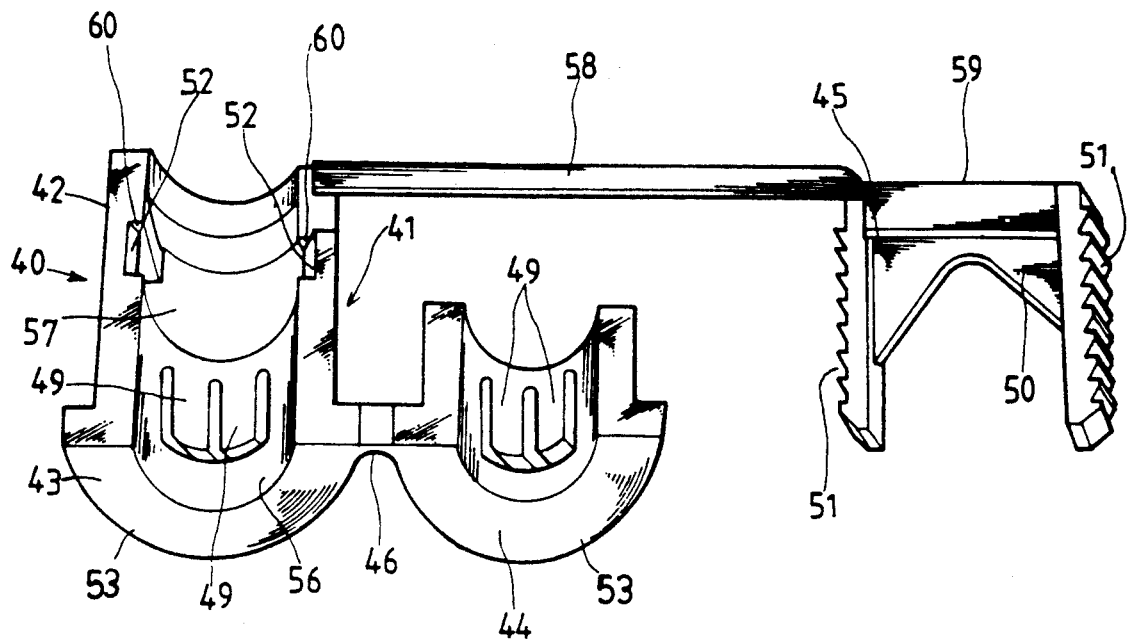
FIG. 9 is an isometric view of a round embodiment of the strain relief bushing of the present invention including aperture engaging fingers.
Figure 10:
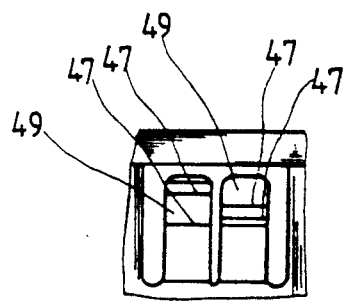
FIG. 10 is a bottom plan detail of FIG. 10 showing the engaging fingers.

As shown in FIGS. 9 and 10, another embodiment of the present invention is a molded very large wire range strain relief bushing 40 which includes a body 41 having a rear portion 42 and a first head portion 43 and a second head portion 44. There is a key 45 and a hinge 46.

As can be seen in FIGS. 9 and 10, spring biased fingers 49 extend from the body 41 just behind the head portion 43 and second head portion 44 to hold the strain relief bushing 40 biased firmly against the chassis walls between the chassis wall (not shown) and the inside portion of the head flange 53 of the molded strain relief bushing 40 when the bushing 40 is engaged in an aperture. The key 45 has a V shaped inner panel 50 and side ratchets 51 engagable with pawls 52 in the body 41.

The body 41 has an opening 56 therethrough, which is defined as shown in FIG. 9 by the joined first and second head portions 43, 44. There is also a well 57 in the body 41 and a strap 58 joining the key 45 to the body 41. The key 45 includes a head 59. The pawls 52 are preferably in channels 60 in the body 41.

The fingers 49 have shoulders 47 as can be seen in FIG. 10. The shoulders 47 adapted to firmly hold the molded strain relief bushing 40 firmly at different chassis wall thicknesses.

Figure 11:
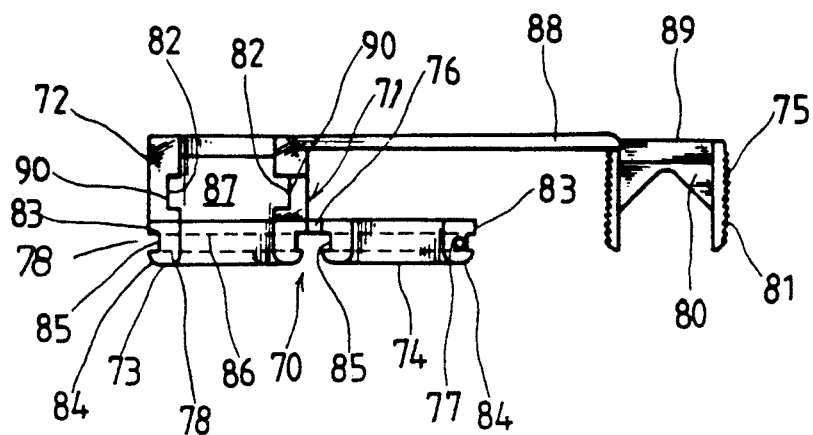
FIG. 11 is a top plan view of another embodiment of the molded plastic strain relief bushing of the present invention.
Figure 12:
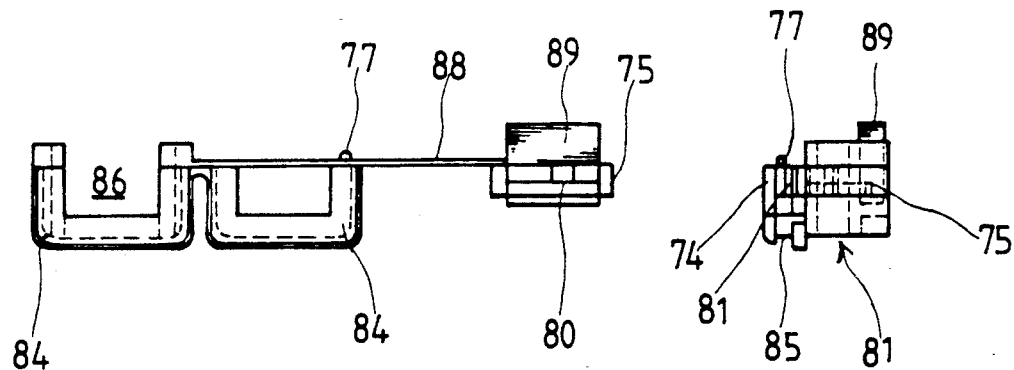
FIG. 12 is a front elevation of FIG. 11.
Figure 13:
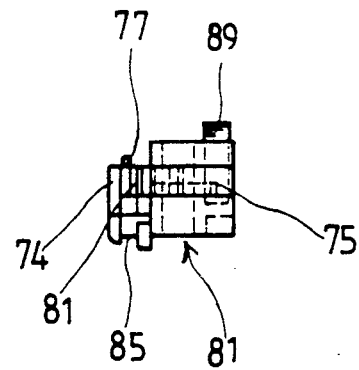
FIG. 13 is a side elevation of FIG. 11.

As can be seen in FIGS. 11, 12 and 13, another embodiment of the molded very large wire range strain relief bushing 70 includes a body 71 having a rear portion 72 and a first head portion 73 and a second head portion 74. There is a key 75 and a hinge 76. The second head portion 74 includes a pin 77 engagable in an opening 78.

The first head portion 73 and second head portion 74 when engaged hold the strain relief bushing 70 within the panel walls when the bushing 70 is engaged in an aperture (not shown). The key 75 has a V shaped inner panel 80 and side ratchets 81 engagable with pawls 82 in the body 71. The first and second head portions, 73, 74 each have back panels 83 and front panels 84, which form channels 85 in the head portions 73, 74. for holding the molded strain relief bushing 70 engaged in and aperture.

The body 71 has an opening 86 therethrough, which is defined by the joined first and second head portions 73, 74. There is also a well 87 in the body 71 and a strap 88 joining the key 75 to the body 71. The key 75 includes a head 89. The pawls 82 are preferably in channels 90 in the body 71.

When the first and second head portions 73, 74 are engaged the pin 77 engages itself in the opening 78 locking the first and second head portions 73, 74 together.

In use, a molded strain relief bushing 10 of the present invention as shown in FIGS. 1 through 8, is preferably in an open condition when wire, cable or bundles of wire or cable, of different diameter are manually or automatically laid into the opening 26 in the body 11. Once the wire, cable or bundles of wire or cable, of different diameter laid, the side ratchets 21 of the key 15 are engaged in the channels 30 and with a pliers, manually or automatically the key 15 is depressed engaging the wire, cable or bundles of wire or cable, of different diameter in the well 27 in a lazy bend configuration in strain relief engagement as can be seen in FIGS. 7 and 8. Of course single wires of different diameters can be laid into the opening 26.

The second head portion 14 may then be rotated on the hinge 16 over the second head portion 14 with the detent 17 sliding over the latch 18 engaging the first head portion 13 and second head portion 14 locked to each other.

When the the first head portion 13 and second head portion 14 are locked to each other the channels 25 are aligned so that the molded strain relief bushing 10 can be slid into the U shaped walls of a chassis (not shown). In this configuration a series of molded strain relief bushings 10 could be stacked in the aperture.

The fingers 19 are biased outward and engage the chassis walls or possible a stacked molded strain relief bushing 10 helping to take up any slack between the chassis wall and the channels 25. In stacking the fingers 19 may interengage. The fingers 19 may be on the sides of the molded strain relief bushing 10 to engage side walls of the aperture or the molded strain relief bushing 10 may be rotated ninety degrees and or alternated in rotation in stacking for better stacking.

The key 15 separately holds the wire, cable or bundles of wire or cable, of different diameter independent of the position of the first head portion 13 and the second head portion 14 enabling pre assembly of the molded stain relief bushing 10 and the wire, cable or bundles of wire or cable, of different diameter or automated assembly. The ability to lay in the wire, cable or bundles of wire or cable, of different diameter is easier than threading through a hole as in the prior art. A single chassis opening accepts a single molded strain relief bushing 10 with a uniform frontal appearance and a wide wire range for wire, cable or bundles of wire or cable, of different diameter.

The construction of the molded strain relief bushing 10 allows great leeway as to wire used in a chassis with only one size aperture and reduces inventory demand as to the number of types of bushings that have to be inventoried. In preferred embodiments, wall thicknesses are compensated for providing even greater use flexibility.

The key 15 as shown in FIGS. 1, 7 and 8 has an inner panel 20 which is tapered upward to the center in a V configuration. The inner panel 20 thus tends to center its load of wire, cable or bundles of wire or cable, of different diameter. The inner panel 20 may also be half round or flat to meet specific situations. The side ratchets 21 are for coarse or fine adjustments. The key 15 helps visually determine the the degree of crimping.

The installation of the molded strain relief bushing 10 presents a visually pleasing appearance and protects the and protects the wire, cable or bundles of wire or cable, of different diameter by having the key 15 placable inside the chassis and not subject to accidental disruption.

As shown in FIGS. 9 and 10, the molded strain relief bushing 40 has a rounded body 41. The first head portion 43 and second head portion 44 serve as a flange when the first head portion 43 and second head portion 44 are folded over each other. The wall of a chassis are then held between the first head portion 43 and the second head portion 44 as a flange portion and the shoulders 47 of the fingers 49. In this configuration the wire, cable or bundles of wire or cable, of different diameter must be threaded through the aperture although the engagement of the wire, cable or bundles of wire or cable, of different diameter in the opening 56 is still just a matter of laying them in. It may also be necessary to thread the key 45 on the strap 58 through the aperture before engaging the wire, cable or bundles of wire or cable, of different diameter in the opening 56 or the side ratchets 51 in the channels 60.

As shown in FIGS. 11 through 13, the molded strain relief bushing 70 has a D shaped body 71. When the the first head portion 73 and second head portion 74 are locked to each other the channels 85 are aligned so that the molded strain relief bushing 70 can be slid into the U shaped walls of a chassis (not shown). In this configuration a series of molded strain relief bushings 70 could be stacked in the aperture. The first head portion 73 and second head portion 74 are interengaged with the pin 77 in the opening 78 when the first head portion 73 and second head portion 74 are folded over each other.

The bodies 11, 41, 71 may be rectangular, round or double D shaped. The heads portions 12, 13, 42, 43, 72, and 73 may be rectangular, round or double D shaped. The straps 28, 58 and 88 may be removed in automated assembly.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A molded strain relief bushing comprising a body, said body including a first head portion and a second head portion, said first head portion and second head portion joined by hinge means, said first head portion and second head portion including a face portion, each said face portion including an opening therethrough, said first head portion and second head portion including a flange portion, said first head portion and second head portion engageable to juxtaposed each other with said face openings apposed, a longitudinal channel, said longitudinal channel in said body integral and contiguous with one of said head portions, said longitudinal channel including a well, means to receive key means, said means to receive key means comprising a pair of channels in said body portion substantially perpendicular to said longitudinal channel straddling said longitudinal channel and adjacent said well, at least one of said channels including a pawl, key means, said key means substantially an inverted U shape, said inverted U shape having and upper portion and lower portion and two sides, said upper portion having a center, said key means engageable in said channels to straddle said well, said key means including ratchets, said ratchets engageable with said at least one channel pawl, said inverted U including a panel, said panel in said upper portion, said panel sloping downward from said center to both said sides, said key means unidirectionally movable in locking engagement in said key receiving means, whereby selected wire or cable engaged in said longitudinal channel is held in strain relief engagement in said well by depressing said key means.

2. The invention of claim 1 wherein said strain relief bushing is in one piece.

3. The invention of claim 1 wherein said key means is attached to said body by a webbing.

4. The invention of claim 1 wherein said head portions include peripheral channels.

5. The invention of claim 1 wherein said head portions include interlocking means.

6. The invention of claim 5 wherein said interlocking means include a latch and detent.

7. The invention of claim 5 wherein said interlocking means include a pin and an engaging opening.

8. The invention of claim 1 wherein said head portions include a plurality of radially outward biased fingers.

9. The invention of claim 1 wherein at least one of said head portions includes at least one axial engaging finger.

10. The invention of claim 9 wherein said at least one engaging finger includes at least one engaging shoulder.

11. The invention of claim 1 wherein said key means includes a head.

12. A method of engaging wire or cable in an aperture in accordance with claim 1 a comprising the steps of providing said wire or cable, laying said wire or cable in said longitudinal channel of said strain relief bushing, engaging said key means in said key receiving means, depressing said key means, juxtaposing said first and second head portion over said laid in wire or cable, and engaging said strain relief bushing in said aperture.

* * * * *

UNITED STATES PATENT AND TRADEMARK OFFICE
CERTIFICATE OF CORRECTION

PATENT NO. : 5,243,139
DATED : September 7, 1993
INVENTOR(S) : Joseph P. Law

It is certified that error appears in the above-identified patent and that said Letters Patent is hereby corrected as shown below:

Column 8:

Claim 1, line 16, insert and change "and", first occurence, to -- an --

Signed and Sealed this

Eighth Day of March, 1994

*Attest:*

BRUCE LEHMAN

*Attesting Officer*  *Commissioner of Patents and Trademarks*